Harold T. Lyman
Francis G. Mason
Jesse C. Jaqua
INVENTORS

BY Dome, McDougall and Hersh
Att'ys

HIGH-f CIRCUIT

Harold T. Lyman
Francis G. Mason
Jesse C. Jaqua
INVENTORS

BY Dorns, McDougall and Hersh
Att'ys

Harold T. Lyman
Francis G. Mason
Jesse C. Jaqua
INVENTORS

BY Dome, McDougall and Hersh
Attys

Harold T. Lyman
Francis G. Mason
Jesse C. Jaqua
INVENTORS

BY Ooms, McDougall and Hersh
Att'ys

Harold T. Lyman
Francis G. Mason
Jessie C. Jaqua
INVENTORS

By Dorns, McDougall and Hersh
Attys

United States Patent Office 3,156,884

Patented Nov. 10, 1964

3,156,884

ULTRA HIGH FREQUENCY TUNER HAVING RECTILINEARLY SLIDING PLATES PROVIDING VARIABLE INDUCTANCE AND CAPACITANCE

Harold T. Lyman, Milford, Francis G. Mason, Weston, and Jesse C. Jaqua, New Haven, Conn., assignors to Aladdin Industries, Incorporated, Nashville, Tenn., a corporation of Illinois Filed Apr. 30, 1962, Ser. No. 190,881
4 Claims. (Cl. 334—68)

This invention relates to tuners, particularly for ultra high frequency (UHF) applications, such as radio and television receivers and other equipment.

One object of the present invention is to provide a new and improved tuner having a tuned circuit, especially suitable for use in an oscillator, in which both the inductance and the capacitance are varied in a novel manner. In this way, the tuner provides an extremely wide range of frequency coverage.

A further object is to provide a new and improved tuner of the foregoing character which is extremely small and compact and reasonably low in cost.

Another object is to provide a new and improved arrangement, in a tuner for a superheterodyne receiver, whereby a pickup conductor is employed to transfer energy from the superheterodyne oscillator to the superheterodyne mixer, while overcoming the effect of unwanted resonances in the pickup conductor.

It is another object to provide a tuner having a new and improved tracking arrangement, whereby the tuning curve of the tuner may be varied at a multiplicity of points in the tuning range, so that the tuning curve may be brought into a desired relationship with another tuning curve, or with the calibration of a dial or the like.

A further object is to provide a new and improved tracking arrangement of the foregoing character in which the tracking arrangement is applied to a tuner of the variable cavity type.

Another object is to provide such a new and improved tracking arrangement which utilizes a fine tuning member adapted to be operated by a selectively adjustable camming mechanism operable by the drive for the main tuning member.

Further objects and advantages of the present invention will appear from the following description, taken with the accompanying drawings, in which.

Figure 1:
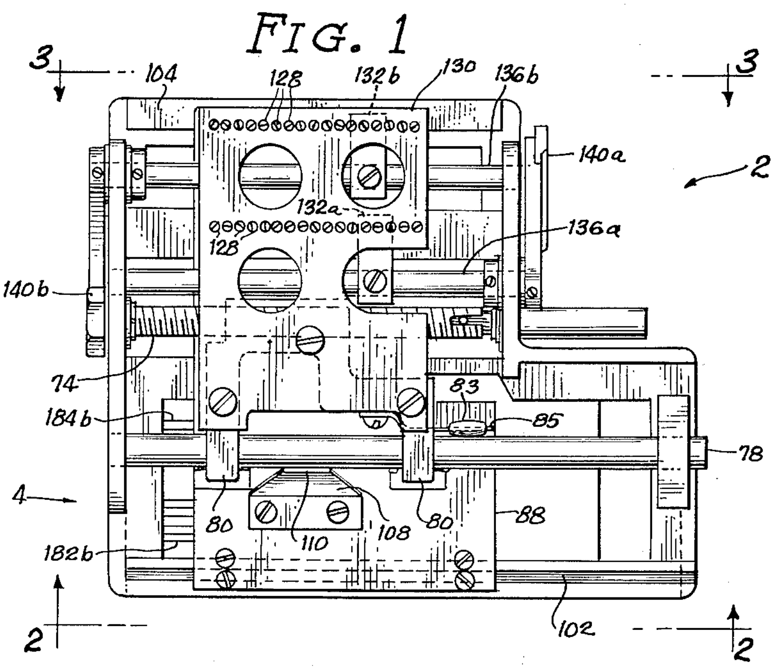
FIG. 1 is a plan view showing the top of a superheterodyne UHF tuner to be described as an illustrative embodiment of the present invention.

It will be understood by those skilled in the art that the invention may be applied to radio and television receivers and various other types of high frequency equipment. Thus, it is merely by way of example that the illustrative embodiment shown in the drawings takes the form of a superheterodyne tuning unit 2 intended for use in connection with a radio or television receiver in the ultra high frequency range. The tuning unit 2 is capable of covering an extremely wide tuning range, which, for example, may extend from 300 to 1,000 megacycles per second.

The illustrated tuning unit 2 comprises a superheterodyne local oscillator 4 which utilizes an electronic oscillation generating device, such as the illustrated triode vacuum tube 6, for example. A signal from the oscillator 4 is fed into a superheterodyne mixer 8. In this case, the mixer 8 utilizes a crystal diode or rectifier 9. The incoming radio or television signals are also fed to the mixer 8, through two radio frequency tuner sections or preselector stages **12*a* and 12*b***.

Various features of the tuner sections **12*a* and 12*b* are in accordance with the invention disclosed and claimed in the co-pending application of Francis G. Mason, Serial No. 143,343, filed October 6, 1961. The tuner sections 12*a* and 12*b* are quite similar in construction. Thus, for the most part, the following description will be directed to the first tuner stage 12*a*. The second tuner stage 12*b*** may be considered to be the same, except as otherwise specifically indicated.

The illustrated tuner section **12*a* is of the cavity type and thus comprises a conductive metal body 14 (FIGS. 6, 7 and 8) which is formed with an internal cavity or chamber 16. The body 14 may be in the form of a metal casting 18, having a cover plate 20 secured to one side thereof. In this case, the cavity 16 is rectangular in shape, but any other suitable shape may be utilized. Thus, the cavity 16 is bounded by end walls 22 and 24, side walls 26 and 28, a top wall 30, and a bottom wall 32. In this case, the bottom wall 32 is formed by the cover plate 20. The side wall 26 is in the form of a partition between the cavities of the first and second tuner sections 12*a* and 12*b***.

The illustrated cavity tuner section **12*a* is of the re-entrant type and thus is provided with a center post 34 which extends longitudinally in the cavity 16. As shown, the center post 34 takes the form of two overlapping sections or members 36 and 38 (FIGS. 8 and 9) which are connected to opposite end walls of the body 14. In this case, the overlapping portions 36 and 38 are connected to the end walls 22 and 24**, respectively.

Figure 14:
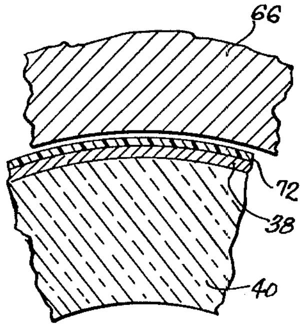
FIG. 14 is a fragmentary greatly enlarged cross-sectional view taken generally along the line 14—14 in FIG. 8.

In order that the tuner may be made with a high degree of precision, yet at moderate cost, the two portions 36 and 38 of the center post 34 are preferably formed as thin patterned metal coatings or members on a cylinder or rod 40 (FIG. 14), which may be made of a suitable insulating material, such as steatite, glass, or various other ceramic or plastic materials. The metal coatings or members which make up the center post sections 36 and 38 may be applied to or formed on the insulating member 40 in the desired patterns by the utilization of well known printed circuit techniques.

A gap or band 42 (FIGS. 8 and 9) of the insulating material is provided between the overlapping sections 36 and 38. It will be seen that the center post section 36 extends from a conductive cylindrical member 44 which is connected to the end wall 22. Similarly, the section 38 extends from a conductive cylindrical member 46 which is connected to the end wall 24. The section 36 is disposed on one side portion of the cylindrical insulating member 40, while the section 38 is disposed on the opposite side portion thereof. The section 36 projects toward the end wall 24 but is insulated therefrom. Similarly, the section 38 projects toward the end wall 22 but is insulated therefrom.

Input and output connections may be made to the cavity sections 12*a* and 12*b* in any known or suitable manner. Various input and output elements are well known to those skilled in the art. In the illustrated tuner 10, an input connection is made to the initial tuner section 12*a* by means of a coupling loop 48 which is connected between an input terminal 50 and the cover plate 20 of the body 14. A connector 52 may be mounted on the plate 20 for the purpose of connecting the input terminal 50 to a coaxial input cable. It will be seen that the loop 48 is disposed longitudinally in the cavity 16, at one end thereof, adjacent the end wall 22 and the center post section 36. With this arrangement, the magnetic field in the cavity is strongest in the end portion of the cavity adjacent the loop 48.

In the illustrated arrangement, energy is coupled between the cavity sections 12*a* and 12*b* by means of a slot 54 which is formed in the partition 26, at the end of the cavity adjacent the end wall 22 and the loop 48. The slot 54 permits magnetic interlinkage between the tuner sections 12*a* and 12*b* so that signals will be magnetically coupled therebetween.

The output from the second cavity section 12*b* may be taken by means of a second coupling loop 56 which is similar to the loop 48 but is connected between one end 22 of the cavity section 12*b* and an output lead 58. As shown, the output lead 58 extends through a small opening 60 in the side wall 28 and is connected to the diode rectifier 9, employed in the superheterodyne mixer 8.

The resonant frequency of the illustrated tuner section 12*a* is varied by moving an electrode 66 along the center post 34. As shown, the electrode 66 takes the form of a conductive metal sleeve or cylinder which is slidably received around the center post 34. Outward projecting flanges 68 and 70 are formed on the opposite ends of sleeve 66.

An insulating layer or space is provided between the sleeve 66 and the center post 34 so that the sleeve will be capacitively coupled to the center post sections 36 and 38. In the illustrated construction, the insulating layer takes the form of a thin coating 72 (FIG. 14) of insulating material on the outside of the center post 34. The coating conveniently may be applied to all of the exposed outer surfaces of the portions 36, 38, 40, 44 and 46. It will be realized that an insulating film might alternatively be applied to the inside of the sleeve 66. The insulating layer may be made of any suitable low-loss plastic material, such as Teflon, which has the particular advantage of reducing the friction between the sleeve 66 and the center post.

Figure 8:
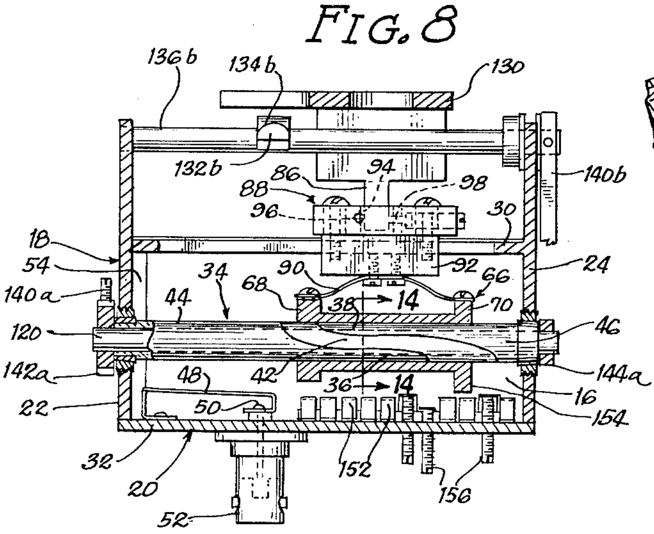
FIG. 8 is an elevational section, taken generally along the line 8—8 in FIG. 6.

The movement of the sleeve 66 has the effect of varying the capacitance between the center post sections 36 and 38. This in turn has the effect of varying the resonant frequency of the cavity tuner section. As shown in FIG. 8, the sleeve 66 almost completely surrounds both center post sections 36 and 38. This represents approximately the position of maximum capacitive coupling between the sections 36 and 38. Thus, the position of the sleeve 66, as shown in FIG. 8, represents approximately the low frequency end of the tuning range. It will be understood that the sleeve 66 is capacitively coupled to both center post sections 36 and 38 and thus is the means of establishing increased capacitive coupling between the center post sections.

The sleeve 66 may be moved to the left, as seen in FIG. 8, so as to disengage the sleeve in a progressive manner from the center post section 38. Such movement of the sleeve reduces the capacitance between the center post sections 36 and 38. In its position of extreme movement to the left, the sleeve 66 is received around the cylindrical conductor 44 so that the capacitive coupling between the center post sections 36 and 38 is at a minimum. This position represents the extreme high frequency end of the tuning range.

To provide for the desired movement of the sleeve 66, the tuner 10 is provided with a precision lead screw 74 (FIG. 1) which may be rotated by any suitable drive. A traveling nut 76 (FIG. 6) is threaded onto the lead screw 74 and is prevented from rotating by means of a guide rod 78. It will be seen that the nut 76 is formed with arms or fingers 80 which engages the upper side portion of the guide rod 78. The lower side portion of the rod 78 may be engaged by anti-friction pads 82 (FIG. 2) on the outer ends of leaf springs 84 which are mounted on the underside of the nut 76. The rod 78 is also engaged by an anti-friction pad 83 (FIG. 1) on the free end of a leaf spring 85, mounted on the side of the nut 76.

The illustrated nut 76 has a downwardly projecting tongue 86 (FIG. 6) adapted to operate a movable carriage 88 on which the sleeves 66 are mounted. In this case, a bow-shaped leaf spring 90 (FIG. 8) is employed to connect each sleeve 66 to the carriage 88. The ends of spring 90 are connected to the flanges 68 and 70 on the sleeve 66. The center portion of the spring 90 is connected to an insulating block 92 which is secured to the underside of the carriage 88. Thus, the sleeve 66 is insulated from the carriage 88. No external electrical connection is made to the sleeve 66.

In the illustrated construction, the tongue 86 extends into a slot 94 formed in the carriage 88. A ball 96 may be interposed between one side of the slot 94 and the tongue 86. The other side of the tongue may be engaged by a spring-pressed pin 98 mounted in the carriage 88.

Figures 6, 10, 11, 12:
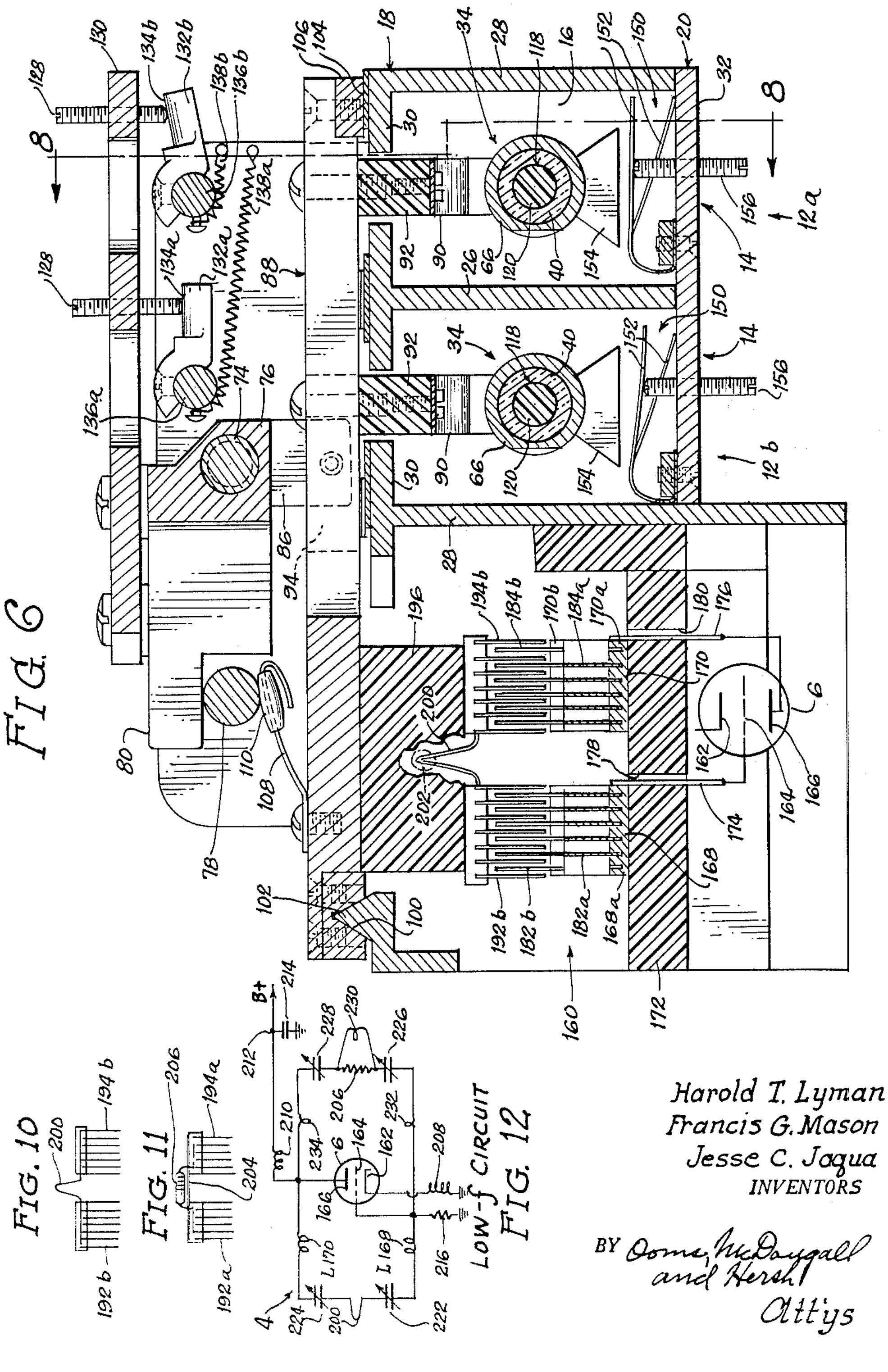
FIG. 6 is an enlarged somewhat diagrammatic cross-sectional view taken generally along the broken line 6—6 in FIG. 2.
FIG. 10 is a fragmentary elevational view, taken generally as indicated by the line 10—10 in FIG. 2.
FIG. 11 is a fragmentary elevational view, taken generally as indicated by the line 11—11 in FIG. 2.
FIG. 12 is a diagram representing the approximate equivalent circuit of the tuner for the low frequency portion of the tuning range.

As shown to advantage in FIG. 6, one end portion of the illustrated carriage 88 is formed on its underside with a V-shaped groove 100 which is slidable along a stationary V-shaped way or slide 102. In this way, the carriage is constrained to slide along a straight line path. The other end of the carriage 88 is guided by an upwardly facing flat surface or way 104 which may be provided on the upper side of the casting 18. The carriage 88 may be fitted with an anti-friction pad 106, adapted to slide along the flat surface 104.

The springs 90 of the cavity sections 12*a* and 12*b* have the effect of pulling the carriage 88 downwardly against the flat guiding surface 104. At the same time the springs 90 provide uniform upward pressure on the sleeves 66 so that the sleeves will slide easily along the center post 34. To provide additional spring pressure between the carriage 88 and the V-shaped way 102, a leaf spring 108 is mounted on the carriage. The outer end of the leaf spring 108 is provided with an anti-friction pad 110 which engages the underside portion of the guide rod 78.

The illustrated drive arrangements eliminates any play or binding effect between the various movable elements of the drive, so that the sleeves 66 may be translated easily and with a high degree of precision. The illustrated drive reduces backlash to such an extent that it is virtually negligible. Thus, the tuner may be reset to a desired position with an extremely high degree of precision.

As previously indicated the movement of the sleeve 66 along the center post 34 changes the amount of capacitance between the center post sections 36 and 38. In this way, the resonant frequency of the tuner cavity section is varied. An extremely wide range of frequencies may be covered. Thus, the range from 315 to 1000 megacycles may be covered with only about 2½ inches of sleeve travel.

The illustrated cavity tuner construction is highly efficient electrically. It has been found that unloaded Q values in the range from 700 to 1100 can readily be obtained.

Figure 5:
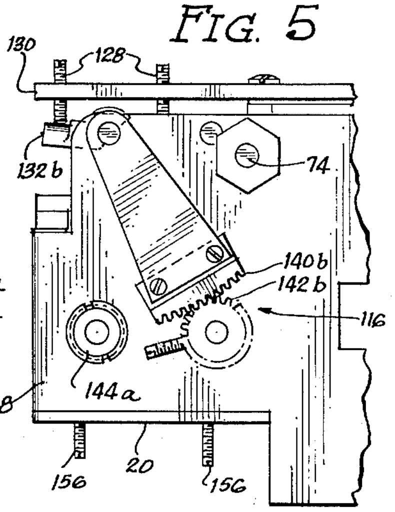
FIG. 5 is a rear elevational view, taken generally as indicated by the line 5—5 in FIG. 3.

The tuner sections 12*a* and 12*b* are provided with tracking mechanisms 116 (FIG. 5) so that the tuner secions may be tracked accurately with the oscillator 4, or with a predetermined dial calibration or other tuning curve. As shown to advantage in FIG. 7, each of the tracking mechanisms 116 comprises a fine tuning member or electrode 118 which is movable relative to the overlapping sections 36 and 38 of the center post 34. In this case, the fine tuning electrode 118 is rotatable within the insulating tube 40 which supports the center post sections 36 and 38. The fine tuning electrode 118 is similar in shape to one of the center post sections 36 and 38, in this case the section 36. As the electrode 118 is rotated, it is moved into and out of alignment with the center post section 36. When the electrode 118 is aligned with the section 36, the electrode 118 has little or no effect upon the capacitance between the sections 36 and 38. When the electrode 118 is moved out of alignment with the section 36, it progressively overlaps the section 38, so as to cause an increase in the capacitance between the sections 36 and 38.

Figure 7:
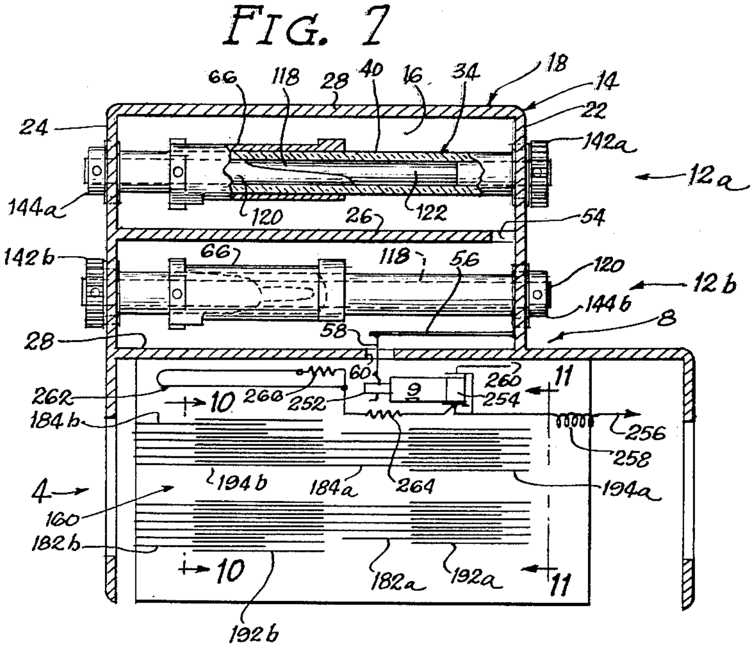
FIG. 7 is a somewhat diagrammatic horizontal section, taken generally along the line 7—7 in FIG. 2.

It will be seen from FIG. 7 that the fine tuning electrode 118 is generally semi-cylindrical in shape and is supported on one side portion of a cylindrical rod 120, made of electrically insulating material. It will be noted that the electrode 118 tapers toward its outer end. The inner end portion of the electrode 118 is formed into a continuous cylindrical band 122 which is disposed within the cylindrical portion 44 of the center post section 36. Preferably, the electrode 118, together with its cylindrical inner portion 122, is formed as a conductive coating on the insulating rod 120. The coating may be applied by any known or suitable printed circuit techniques.

Figure 9:
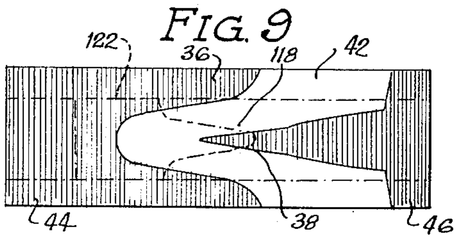
FIG. 9 is a somewhat diagrammatic developed view showing details of one of the tuning elements employed in the tuner.
Figure 15:
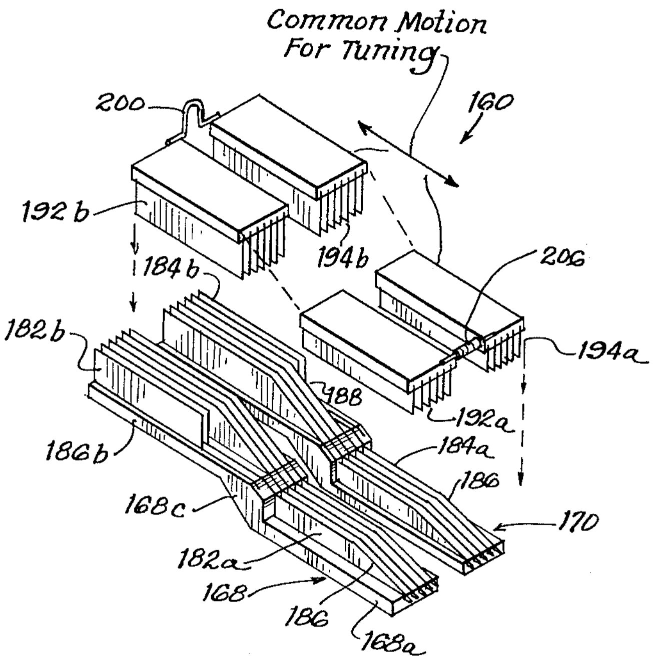
FIG. 15 is a fragmentary exploded perspective view showing the stationary and movable tuning plates and associated components of the tuner, the movable plates being separated upwardly from the stationary plates for clarity of illustration.

The relationship of the fine tuning electrode 118 to the center post sections 36 and 38 is shown to good advantage in FIG. 9, which is a developed view of the sections 36 and 38 and the electrode 118, rolled out into a flat plane. In FIG. 9, the electrode 118 is shown in the position in which it overlaps the center post section 38 to the maximum possible extent, so as to cause the maximum increase in the capacitance between the sections 36 and 38. It will be realized that the electrode 118 is capacitatively coupled to both center post sections 36 and 38. No external electrical connection is made to the electrode 118.

The insulating material of the tube 40 acts as a dielectric between the electrode 118 and the center post sections 36 and 38 so as to increase the effectiveness of the electrode 118. Thus, the rotation of the electrode 118 may change the resonant frequency of the tuner by as much as 10%. In this way, an unusually wide range of tracking adjustment is provided.

Figure 3:
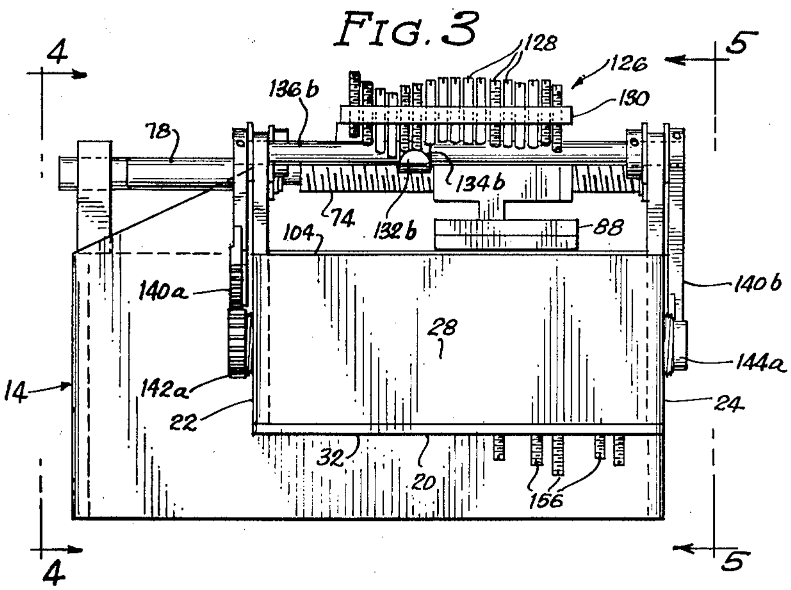
FIG. 3 is an elevational view of the opposite side, taken generally as indicated by the line 3—3 in FIG. 1.
Figure 4:
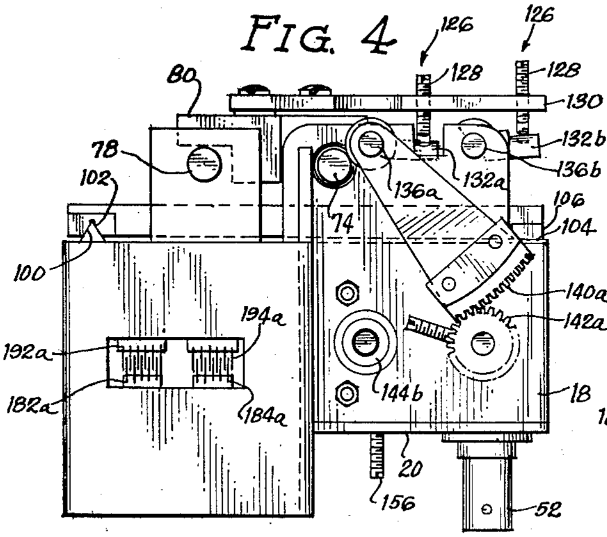
FIG. 4 is a front elevational view taken generally as indicated by the line 4—4 in FIG. 3.

The tracking mechanisms 116 provide adjustable means whereby the fine tuning electrodes 118 of both tuner sections 12*a* and 12*b* may be selectively rotated in response to the operation of the main driving mechanism. Thus, each tracking mechanism 116 comprises adjustable camming means 126 (FIGS. 3–6), adapted to be moved by the main driving mechanism. In this case, each camming arrangement 126 comprises a plurality of adjustable screws 128 which are threaded through a plate 130 secured to the traveling nut 76. The camming screws 128 of each set project downwardly through the plate 130 and are engageable with a movable cam follower. For clarity, the cam follower for the first tuner section 12*a* will be referred to as 132*a*, while the cam follower for the second tuner section 12*b* will be referred to as 132*b*. As shown to advantage in FIG. 3, the cam followers 132*a* and 132*b* have generally semi-cylindrical upper surfaces 134*a* and 134*b*, so as to slide easily along the lower ends of the closely spaced camming screws 128. The cam followers 132*a* and 132*b* are secured to rotatable shafts 136*a* and 136*b*, which are thus adapted to be rotated through limited angles by the action of the camming screws 126. Springs 138*a* and 138*b* (FIG. 6) are connected to the shafts 136*a* and 136*b* and are arranged to bias the cam followers 132*a* and 132*b* upwardly against the camming screws 128.

The shafts 136*a* and 136*b* are connected or linked to the fine tuning electrodes 118 so that rotation of the shafts will cause the electrodes to be rotated. In this case, gear sectors 140*a* and 140*b* are secured to the shafts 136*a* and 136*b*. As clearly shown in FIGS. 4 and 5, the gear sectors 140*a* and 140*b* are on opposite ends of the shafts 136*a* and 136*b*. The gear sectors 140*a* and 140*b* mesh with gears or pinions 142*a* and 142*b*, mounted on the rotatable rods 120 which support the fine tuning electrodes 118 of the tuner sections 12*a* and 12*b*. The gears 142*a* and 142*b* are on opposite ends of the rods 120. The rods 120 are provided with collars or retainers 144*a* and 144*b*, on the ends thereof opposite from the respective gears 142*a* and 142*b*.

It will be understood that the camming screws 128 may be adjusted so that their lower ends lie in the same horizontal plane. In that case, the corresponding cam followers 132*a* and 132*b* will not be moved to any significant extent as the traveling nut 76 is translated throughout its range of travel. For this adjustment of the screws 128, there will be no movement of the tracking electrodes 118. Normally, however, it will be necessary to make tracking adjustments by adjusting the screws 128 to different positions, as shown to advantage in FIG. 3. In that case, the cam followers 132*a* and 132*b* will follow the lower ends of the screws as the nut 76 is translated. Thus, the cam followers 132*a* and 132*b* will be rocked or swung to various positions. The gear sectors 140*a* and 140*b* and the gears 142*a* and 142*b* transmit and amplify the swinging movement of the cam followers 132*a* and 132*b*, so that the tracking electrodes 118 are rotated through angles considerably greater than the movement of the cam followers. Thus, considerable changes in the tracking of the tuner sections 12*a* and 12*b* may be made by adjusting the camming screws 128. Inasmuch as there are a multiplicity of camming screws 128 in each of the camming sets 126, the tracking may be adjusted at a multiplicity of points throughout the tuning range.

Each of the tuner sections 12*a* and 12*b* is also provided with a supplemental or auxiliary tracking arrangement 150 (FIG. 6), comprising a multiplicity of electrodes 152 which are movable into capacitative coupling with the tuning sleeve 66. In this case, the electrodes 152 take the form of spring leaves or blades which are mounted on the lower wall 32 of the cavity 16. Thus, the electrodes 152 are grounded to the outer housing 18 of the cavity. As shown in FIG. 8, the electrodes 152 are distributed along the path of movement of the tuning sleeve 66. A flange or lug 154 projects downwardly from one end of the sleeve 66 to establish the capacitive coupling with the electrodes 152. Each electrode spring 152 may be provided with a screw 156, threaded through the lower wall 32, for adjusting the position of the spring. However, some of the screws 156 may be removed or omitted, if not needed to achieve the desired tracking adjustment. Initially, each electrode spring 152 is biased by its own resiliency to its lowermost position, remotely spaced from the flange 154. By inserting the corresponding screw 156 and screwing it upwardly, the spring 152 may be swung upwardly into closely spaced relationship with the flange 154. Actual contact between the springs 152 and the flange 154 must be avoided to prevent the tuning sleeve 66 from being grounded. In FIG. 8, the tracking springs 152 are shown in various positions of adjustment.

The oscillator 4 has a tuned circuit 160 which is arranged so that both the inductance and the capacitance in the circuit may be simultaneously varied. In this way the variable tuned circuit 160 is enabled to cover an extremely wide frequency range. As previously indicated, the illustrated oscillator 4 utilizes an oscillation generating device in the form of a triode vacuum tube 6 having a cathode 162, a grid 164 and a plate or anode 166. In this case, the tuned circuit 160 is connected between the grid 164 and the plate 166, as shown to advantage in FIG. 6.

The illustrated tuned circuit 160 comprises a pair of parallel conductive bars 168 and 170 which are in the nature of parallel line conductors. The bars are spaced apart and are mounted on an insulating support 172. In this case, the bar 168 has an inner end portion 168*a* and an outer end portion 168*b*. It will be seen from FIG. 2 that the outer end portion 168*b* is offset upwardly from the inner end portion 168*a*. A slanting or diagonal portion 168*c* extends between the portions 168*a* and 168*b*. Similarly, the bar 170 has inner and outer end portions 170*a* and 170*b*. The outer portions 168*b* and 170*b* are spaced apart the same distance as the inner portions 168*a* and 170*a*, all of such portions being substantially parallel to one another. It will be apparent from FIGS. 2 and 6 that the grid 164 and the plate 166 are connected to the inner end portions 168*a* and 170*a*, by means of straps or other conductors 174 and 176 extending downwardly through openings 178 and 180 in the insulating support 172. The bar 170 is entirely insulated from the bar 168.

To provide for variation of the inductance and capacitance of the tuned circuit 160, two sets of capacitive coupling plates are mounted on each of the bars 168 and 170. Thus, an inner set of plates 182*a* is mounted on the inner end portion 168*a* of the bar 168. Similarly, an inner set of plates 184*a* is mounted on the inner end portion 170*a* of the bar 170. Outer sets of plates 182*b* and 184*b* are mounted on the outer end portions 168*b* and 170*b* of the bars 168 and 170. All of the plates 182*a*, 182*b*, 184*a* and 184*b* extend vertically and are substantially parallel to one another. As shown to advantage in FIG. 2, the outer sets of plates 182*b* and 184*b* are offset upwardly from the inner sets of plates 182*a* and 184*a*. All of the plates may be substantially rectangular, except that the plates preferably have slanting or tapered inner edges 186 and 188.

The capacitive coupling plates 182*a*, 182*b*, 184*a*, and 184*b* are adapted to mesh with inner and outer sets of movable tuning plates 192*a*, 192*b*, 194*a* and 194*b*, all of which extend vertically and are substantially parallel to one another. Provision is made for effecting relative movement between the tuning plates and the coupling plates. Thus, in this instance, the tuning plates 192*a*, 192*b*, 194*a* and 194*b* are mounted on an insulating block 196 which is secured to the underside of the movable carriage 88, near the V-shaped guide groove 102.

Figure 2:
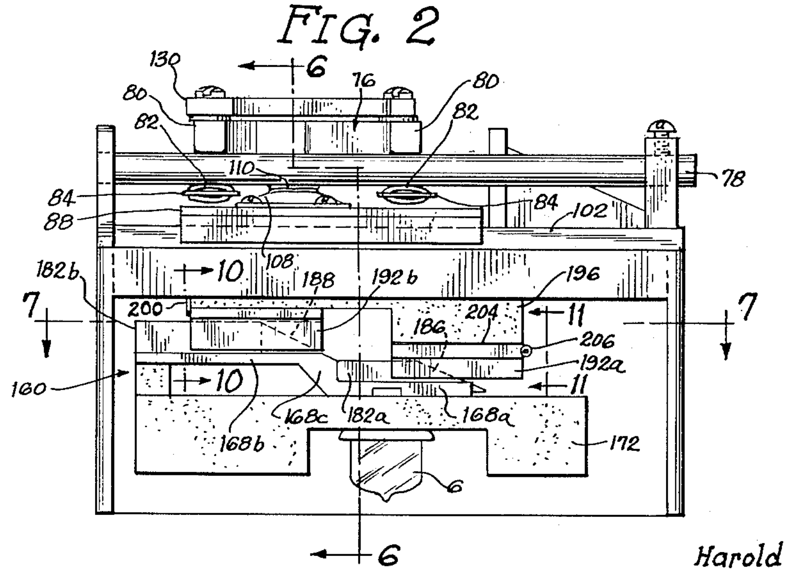
FIG. 2 is a side elevational view, taken generally as indicated by the line 2—2 in FIG. 1.

The outer tuning plates 192*b* and 194*b* are offset upwardly from the inner tuning plates 192*a* and 194*a*. In this way the outer tuning plates 192*b* and 194*b* are adapted to mesh with the outer coupling plates 182*b* and 184*b*, while being adapted to pass over the inner coupling plates 182*a* and 184*a*, when the carriage 88 is translated to the right, as seen in FIG. 2. The inner tuning plates 192*a* and 194*a* are progressively unmeshed from the coupling plates 182*a* and 184*a* as the carriage 88 is translated to the right.

In the illustrated construction, a connection providing a small amount of inductance is employed between the outer sets of tuning plates 192*b* and 194*b*. This connection may take the form of a hairpin-shaped induction loop 200. The inductance of the loop 200 may be adjusted by bending it and by applying solder or the like to the loop so as to bridge a desired portion of the loop. Such a mass of solder 202 is indicated in FIG. 6. In this case, the inner tuning plates 192*a* and 194*a* are connected together by means of a conductive strap or plate 204. Although the inductance of the plate 204 is extremely low, it may cause spurious resonances. To damp out any such resonances, a resistor 206 is also connected between the inner tuning plates 192*a* and 194*a*, in parallel with the plate 204.

Figure 13:
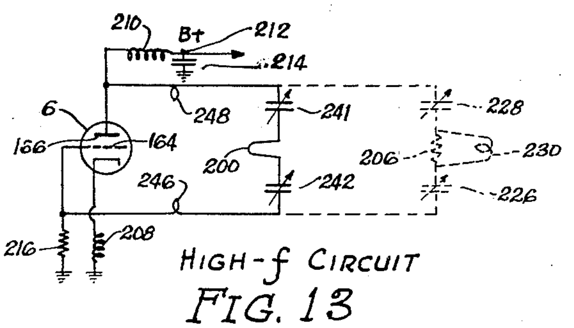
FIG. 13 is a diagram representing the approximate equivalent circuit for the high frequency end of the tuning range.

The oscillator 4 may utilize a conventional circuit, including a radio frequency choke 208 connected between the cathode 162 and ground, and another choke 210 connected between the plate 166 and a positive power supply terminal 212, the negative terminal of the power supply being grounded. A bypass capacitor 214 may be connected between the terminal 212 and ground. As shown in FIGS. 12 and 13, a grid biasing resistor 216 is connected between the grid 164 and ground.

When the carriage 88 is moved as far as possible to the left, as seen in FIG. 2, the outer tuning plates 192*b* and 194*b* are fully meshed with the outer coupling plates 182*b* and 184*b*. Similarly, the inner tuning plates 192*a* and 194*a* are fully meshed with the inner coupling plates 182*a* and 184*a*. This position of the carriage 88 represents the low frequency end of the tuning range. The approximately equivalent circuit of the oscillator for low frequencies is represented in FIG. 12. For the low frequency portion of the tuning range, the principal branch of the tuned circuit between the grid 164 and the plate 166 comprises the inductances of the bars 168 and 170, represented by the inductance elements L168 and L170 in FIG. 12. The elements L168 and L170 should also be taken as including the inductances of the leads 174 and 176 and the inductances of the plates 182*b*, 192*b*, 184*b* and 194*b*, all of which are in series with the inductances of the bars 168 and 170. The inductance of the loop 200 is also effectively in series with the inductances of the bars 168 and 170.

Also in the series circuit are the variable capacitances between the plates 182*b* and 192*b*, and between the plates 184*b* and 194*b*, represented respectively by variable capacitance elements 222 and 224 in FIG. 12. It will be realized that the inductive loop 200 is effectively connected in series between the capacitance elements 222 and 224.

The variable capacitances between the plates 182*a* and 192*a*, and between the plates 184*a* and 194*a*, are represented by variable capacitance elements 226 and 228 in FIG. 12. These capacitance elements 226 and 228 are effectively in series with the inductance 230 of the plate 204, and the inductances 232 and 234 of the plates 182*a*, 192*a*, 184*a*, and 194*a*. All of these inductive elements are small so that the variable capacitance elements 226 and 228 effectively provide additional shunt capacitance between the grid 164 and the plate 166.

When the carriage 88 is translated to the right, the plates 192*b* and 194*b* are progressively unmeshed from the plates 182*b* and 184*b*. This reduces the values of the capacitance elements 222 and 224. At the same time, the effective inductance of the bars 168 and 170 is reduced by the movement of the plates 192*b* and 194*b* to the right. Moreover, the inner plates 192*a* and 194*a* are progressively unmeshed from the plates 182*a* and 184*a*, thus reducing the capacitance of the elements 226 and 228. All of these factors increase the resonant frequency of the tuned circuit 160.

When the carriage 88 is translated as far as possible to the right, as seen in FIG. 2, the tuner is adjusted to the high frequency end of its tuning range. The plates 192*a* and 194*a* are entirely unmeshed from the plates 182*a* and 184*a*, so that the variable capacitance elements 226 and 228 are reduced to very low values, and hence are effectively out of the tuned circuit 160.

FIG. 13 is an approximately equivalent circuit diagram of the oscillator 4 for the high frequency end of the tuning range. In this diagram, the variable capacitance elements 226 and 228, the inductance element 230, and the resistor 206 are represented in broken lines, indicating that these components are effectively out of the tuned circuit. The outer tuning plates 192b and 194b are also entirely unmeshed from the outer coupling plates 182b and 184b, but the plates 192b and 194b are spaced edgewise above the plates 182a and 184a. In FIG. 13, the edgewise capacitances between the plates 182a and 192b, and between the plates 184a and 194b, are represented by variable capacitance elements 242 and 244, which are effectively in series with the inductance loop 200 and inductance elements 246 and 248, between the grid 164 and the plate 166. The inductance elements 246 and 248 represent the effective inductances of the leads 174 and 176, the inner bar portions 168a and 170a, and the plates 182a, 192b, 184a and 194b. All of these inductances are very small, so that the total inductance is greatly reduced at the high frequency end of the tuning range. The edgewise capacitances represented by the elements 242 and 244 are also quite small, so that the oscillator can be tuned to an extremely high frequency of about 1,000 megacycles. In tuning the oscillator between the low and high frequency ends of the tuning range, there is a gradual transition between the conditions represented by FIGS. 12 and 13. The resistor 206 damps out any spurious resonances in which the inductance 230 of the plate 204 would play a part. Thus, the resistor 206 contributes to the smoothness of the tuning variation and prevents sudden jumps in the frequency of the oscillator.

Tracking adjustments may be made in the oscillator 4 in various ways. Thus, the inductance loop 200 may be bent, as desired, and may be effectively shortened by applying solder thereto. The elevation of the plates 192, 192b, 194a, and 194b may be changed rather easily. For example, this may be done by placing shims between the insulating support 196 and the various plate assemblies. If necessary, portions of the various plates may be bent.

As previously indicated, the mixer stage 8 utilizes a crystal diode 9 having terminals 252 and 254. The incoming radio frequency signals are applied to the diode 9 by means of the lead 58 connected between the pickup loop 56 and the terminal 252. The output from the diode 9 is taken by an output lead 256 which is connected to the terminal 254 through a radio frequency choke 258. A small capacitor 260 is provided between the terminal 254 and ground.

In accordance with another feature of the present invention, energy from the oscillator 4 is fed to the mixer diode 9 by means of an elongated pickup conductor 262 which is disposed in proximity to the tuned circuit 160 of the oscillator 4. In this case, the pickup lead 262 is disposed near the plates 184b. A current limiting resistor 264 is connected between the lead 262 and the terminal 254 of the diode 9. To suppress any spurious resonances in the pickup lead 262, the lead is doubled back upon itself to form an elongated loop with a resistor 266 in series therewith. Because of the wide frequency range covered by the tuner, it is difficult to avoid unwanted resonances in the pickup lead 262 but any such resonances are damped out by the resistor 266. In this way, the oscillator energy fed to the mixer diode 9 is maintained at a reasonably uniform level throughout the tuning range.

It will be evident that the tuner of the present invention is highly efficient and versatile, yet is extremely small and compact. The oscillator provides smooth and continuous coverage of an extremely wide frequency range. The preselector units 12a and 12b may be tracked very accurately to the desired tuning curve, established by the oscillator tuning, at a multiplicity of points throughout the tuning range. With all its advantages, the tuner is remarkably low in cost.

Various other modifications, alternative constructions and equivalents may be employed without departing from the true spirit and scope of the invention, as exemplified in the foregoing description and defined in the following claims:

We claim:

1. In a tuner,
the combination comprising an oscillator device having first and second terminals,
first and second generally parallel bars having inner end portions connected to the respective first and second terminals,
said bars having outer end portions offset laterally from said inner end portions,
each bar having inner and outer coupling plates mounted on said inner and outer end portions,
all of said plates on said first and second bars being substantially parallel,
said outer plates being offset in an edgewise direction with respect to said inner plates,
a carriage movable generally in a longitudinal direction with respect to said bars,
first and second inner tuning plates mounted on said carriage and movable into overlapping relation with said respective first and second inner coupling plates,
insulating means mounting said inner tuning plates on said carriage,
a conductive member connected between said first and second inner tuning plates,
first and second outer tuning plates mounted on said carriage and movable into overlapping relation with said first and second outer coupling plates,
an outer inductance element connected between said first and second outer tuning plates,
all of said tuning plates being substantially parallel to the corresponding coupling plates,
and means for translating said carriage to move said inner and outer tuning plates out of overlapping relation to said respective inner and outer coupling plates to reduce both the effective inductance of said bars and the effective capacitance between said bars,
said outer inductance element effectively being in series with the inductance of said bars.

2. In a tuner,
the combination comprising first and second elongated generally parallel conductors having inner and outer end portions,
said outer end portions being generally parallel to said inner end portions but being offset laterally therefrom,
first and second terminals connected to said inner end portions of said conductors,
first and second inner coupling plates connected to said inner end portions of said conductors,
first and second outer coupling plates connected to said outer end portions of said conductors,
all of said plates being generally parallel,
said outer plates being offset edgewise relative to said inner plates,
a tuning member,
means supporting said tuning member and said conductors for relative movement between said tuning member and said conductors in a direction generally parallel to said conductors,
first and second inner tuning plates mounted on said tuning member and movable into overlapping relation to said inner coupling plates,
first and second outer tuning plates mounted on said tuning member and movable into overlapping relation to said outer coupling plates,
insulating means mounting said tuning plates on said tuning member, an additional conductor connected between said first and second inner tuning plates,
an inductance element connected between said first and second outer tuning plates,
the inductance of said inductance element being effectively in series with the inductance of said elongated conductors,
the relative movement between said tuning member and said conductors being effective to move said inner and outer tuning plates into and out of overlapping relation to said inner and outer coupling plates so as to vary both the effective inductance and the effective capacitance between said terminals.

3. In a tuner,
the combination comprising first and second generally parallel line conductors,
each of said conductors having inner and outer end portions,
said outer end portions being offset laterally relative to said inner end portions,
first and second terminals connected to said inner end portions of said line conductors,
first and second inner coupling capacitance members mounted on said inner end portions of said respective first and second conductors,
first and second outer capacitance coupling members mounted on said outer end portions of said first and second conductors,
a tuning member,
first and second inner tuning capacitance members mounted on said tuning member and disposed in variable overlapping relation to said respective first and second inner coupling capacitance members,
first and second outer tuning capacitance members mounted on said tuning member and disposed in variable overlapping relation to said respective first and second outer coupling capacitance members,
conductive means connected between said first and second inner tuning capacitance members,
an inductance element connected between said first and second outer tuning capacitance members,
and means supporting said tuning member and said line conductors for relative movement between said tuning member and said line conductors in a direction generally parallel to said line conductors for thereby moving said inner and outer tuning capacitance members into and out of overlapping relation to said inner and outer coupling capacitance members so as to vary both the effective inductance and the effective capacitance between said terminals.

4. In a tuner,
the combination comprising first and second elongated generally parallel conductors having inner and outer end portions,
first and second terminals connected to said inner end portions of said conductors,
first and second inner coupling plates connected to said inner end portions of said conductors,
first and second outer coupling plates connected to said outer end portions of said conductors,
said outer plates being offset relative to said inner plates,
a tuning member,
means supporting said conductors and said tuning member for relative movement therebetween in a direction generally parallel to said conductors,
first and second inner tuning plates mounted on said tuning member and movable into overlapping relation to said inner coupling plates,
first and second outer tuning plates mounted on said tuning member and movable into overlapping relation to said outer coupling plates,
insulating means mounting said tuning plates on said tuning member,
means connected between said first and second inner tuning plates,
means connected between said first and second outer tuning plates,
the relative movement between said tuning member and said conductors being effective to move said inner and outer tuning plates into and out of overlapping relation to said inner and outer coupling plates so as to vary both the effective inductance and the effective capacitance between said terminals.

References Cited in the file of this patent

UNITED STATES PATENTS

| | | |
|---|---|---|
| 1,580,621 | Mahieu | Apr. 13, 1926 |
| 1,617,618 | Douglas | Feb. 15, 1927 |
| 1,664,685 | Hudson | Apr. 3, 1928 |
| 1,766,002 | Price | June 24, 1930 |
| 1,840,215 | Sordillo | Jan. 5, 1932 |
| 2,092,708 | Wheeler | Sept. 7, 1939 |
| 2,471,155 | Langmuir et al. | May 24, 1949 |
| 2,782,315 | English | Feb. 19, 1957 |
| 2,826,698 | Mason | Mar. 11, 1958 |
| 2,994,046 | Granqvist | July 25, 1961 |
| 3,049,681 | Putzrath et al. | Aug. 14, 1962 |